(12) United States Patent
Lin et al.

(10) Patent No.: US 11,536,926 B2
(45) Date of Patent: Dec. 27, 2022

(54) IMAGE CAPTURING DEVICE

(71) Applicant: Quanta Computer Inc., Taoyuan (TW)

(72) Inventors: Wen-Hsien Lin, Taoyuan (TW); Wen-Shu Lee, Taoyuan (TW); Tsung-Hsun Wu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 75 days.

(21) Appl. No.: 17/146,911

(22) Filed: Jan. 12, 2021

(65) Prior Publication Data

US 2022/0155551 A1   May 19, 2022

(30) Foreign Application Priority Data

Nov. 13, 2020   (TW) .................................. 109214969

(51) Int. Cl.
*G02B 7/02* (2021.01)
*G03B 17/02* (2021.01)

(52) U.S. Cl.
CPC ............. *G02B 7/023* (2013.01); *G03B 17/02* (2013.01)

(58) Field of Classification Search
USPC ........................................ 396/535, 540, 541
See application file for complete search history.

(56) References Cited

U.S. PATENT DOCUMENTS

2020/0195837 A1*   6/2020   Miu ................... H04N 5/23212

FOREIGN PATENT DOCUMENTS

TW   610754 U   *   4/2021
TW   616903 U   *   9/2021

* cited by examiner

*Primary Examiner* — Clayton E. LaBalle
*Assistant Examiner* — Warren K Fenwick
(74) *Attorney, Agent, or Firm* — McClure, Qualey & Rodack, LLP

(57) ABSTRACT

An image capturing device is provided. The image capturing device includes a device housing, a lens module, a restriction unit, and a latch. The device housing has an insertion slot. The lens module pivots on the device housing. Relative to the device housing, the lens module is adapted to be rotated between a first module orientation and a second module orientation. The restriction unit is disposed in the device housing. The latch passes through the insertion slot of the device housing, wherein the latch is adapted to be moved between a first latch position and a second latch position. When the latch is in the first latch position, the latch sufficiently pushes the restriction unit. When the latch is in the second latch position, the pressure from the latch applied to the restriction unit is decreased.

10 Claims, 10 Drawing Sheets

IMAGE CAPTURING DEVICE

CROSS REFERENCE TO RELATED APPLICATIONS

This Application claims priority of Taiwan Patent Application No. 109214969, filed on Nov. 13, 2020, the entirety of which is incorporated by reference herein.

BACKGROUND OF THE INVENTION

Field of the Invention

The present invention relates to an image capturing device, and in particular to an image capturing device with a rotatable lens module.

Description of the Related Art

Image capturing devices are popular. For example, an image capturing device can be disposed in the vehicle to record road conditions. Since the image capturing device may be disposed in different locations of the vehicle (such as the windshield), the lens module of the image capturing device must be rotatable, so that it can be aimed at the desired image. Additionally, the orientation of the lens module must be fastened. However, vibration occurs during the normal operation of the vehicle, and the orientation of the lens module may be changed due to this vibration, affecting the reliability of the image capturing device.

BRIEF SUMMARY OF THE INVENTION

Embodiments of the invention are provided to address the aforementioned difficulty.

In one embodiment, an image capturing device is provided. The image capturing device includes a device housing, a lens module, a restriction unit and a latch. The device housing has an insertion slot. The lens module pivots on the device housing, wherein relative to the device housing, the lens module is adapted to be rotated between a first module orientation and a second module orientation. The restriction unit is disposed in the device housing. The latch passes through the insertion slot of the device housing, wherein the latch is adapted to be moved between a first latch position and a second latch position. When the latch is in the first latch position, the latch sufficiently pushes the restriction unit, and the restriction unit presses the lens module to restrict the rotation of the lens module. When the latch is in the second latch position, the pressure from the latch applied to the restriction unit is decreased, and the lens module is capable of being rotated relative to the device housing.

In one embodiment, the lens module is rotated between the first module orientation and the second module orientation around a rotational axis. The latch is shifted between the first latch position and the second latch position along a sliding axis that is parallel to the rotational axis.

In one embodiment, the restriction unit comprises a restriction gasket and a restriction bracket. The restriction gasket is disposed on the restriction bracket. The lens module comprises a module surface. When the latch is in the first latch position, the latch sufficiently pushes the restriction bracket, the restriction gasket presses the module surface to restrict the rotation of the lens module. When the latch is in the second latch position, the pressure from the latch applied to the restriction bracket is decreased, and the lens module is capable of being rotated relative to the device housing.

In one embodiment, the latch comprises a first latch-pushing portion and a second latch-pushing portion. When the latch is in the first latch position, the first latch-pushing portion abuts the restriction bracket. When the latch is in the second latch position, the second latch-pushing portion abuts the restriction bracket. The first latch-pushing portion is a first distance from the latch axis, which is the axis of the latch. The second latch-pushing portion is a second distance from the latch axis. The first distance is greater than the second distance.

In one embodiment, the latch comprises a first latch protrusion and a second patch protrusion. The first latch-pushing portion is located between the first latch protrusion and the second latch protrusion. The second latch protrusion is located between the first latch-pushing portion and the second latch-pushing portion.

In one embodiment, the latch comprises a first latch end and a second latch end. The device housing comprises a first housing stopping portion and a second housing stopping portion. When the latch is in the first latch position, the first latch end abuts the first housing stopping portion and at least a portion of the second latch end protrudes out of the device housing. When the latch is in the second latch position, the second latch end abuts the second housing stopping portion, and at least a portion of the first latch end protrudes out of the device housing.

In one embodiment, the latch is pillar shaped. The latch comprises a latch planar surface. The device housing comprises a housing planar surface that is formed in the insertion slot. The latch planar surface abuts the housing planar surface.

In one embodiment, the restriction bracket comprises a bracket body and a bracket stage that comprises a stage rib. The bracket body comprises a curved bracket surface. The bracket stage is connected to the bracket body. The restriction gasket is disposed on the curved bracket surface. When the latch is in the first latch position, the latch sufficiently pushes the stage rib, and when the latch is in the second latch position, the pressure from the latch applied to the stage rib is decreased.

In one embodiment, the device housing comprises a first housing wall and a second housing wall. The first housing wall faces the second housing wall. The bracket body comprises a first body side and a second body side. The first housing wall is adapted to abut the first body side. The second housing wall is adapted to abut the second body side. The first housing wall and the second housing wall restrict the movement of the restriction bracket in a first direction. The restriction bracket is adapted to slide in a second direction between the first housing wall and the second housing wall. The second direction is perpendicular to the first direction.

In one embodiment, the device housing comprises a housing hook. The restriction bracket comprises a bracket opening. The housing hook extends into the bracket opening. The housing hook is adapted to abut an inner wall of the bracket opening to restrict the movement of the restriction bracket in a third direction, which is perpendicular to the first direction and the second direction. The restriction bracket comprises a bracket rib. The device housing comprises a third housing wall. The bracket rib is adapted to abut the third housing wall to restrict the movement of the restriction bracket in the third direction.

In the image capturing device of the embodiment of the invention, the orientation of the lens module can be locked by the latch. In the locked state, the position of the latch is restricted, and the latch is prevented from being loosened by outer vibration. The restriction unit can continuously restrict the orientation of the lens module, and the reliability of the image capturing device is improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
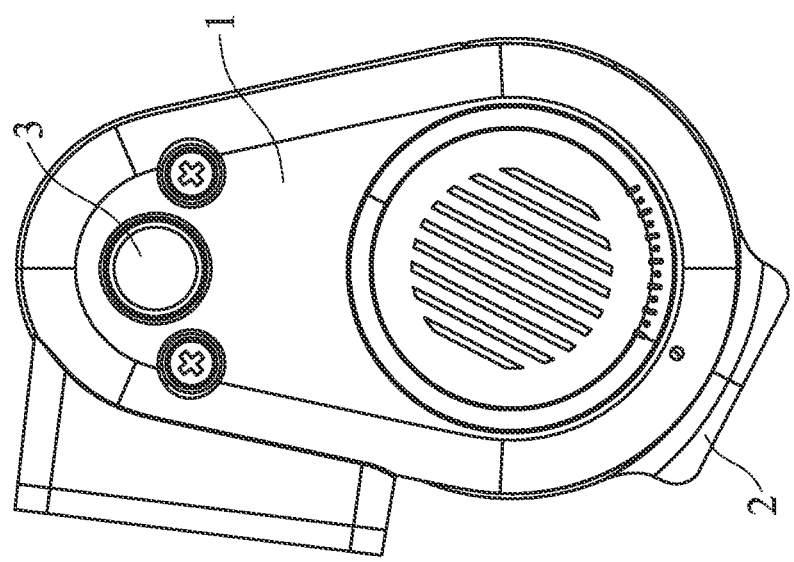
FIG. 1A is a side view of an image capturing device of the embodiment of the invention, wherein the lens module is in a first module orientation.
Figure 1B:
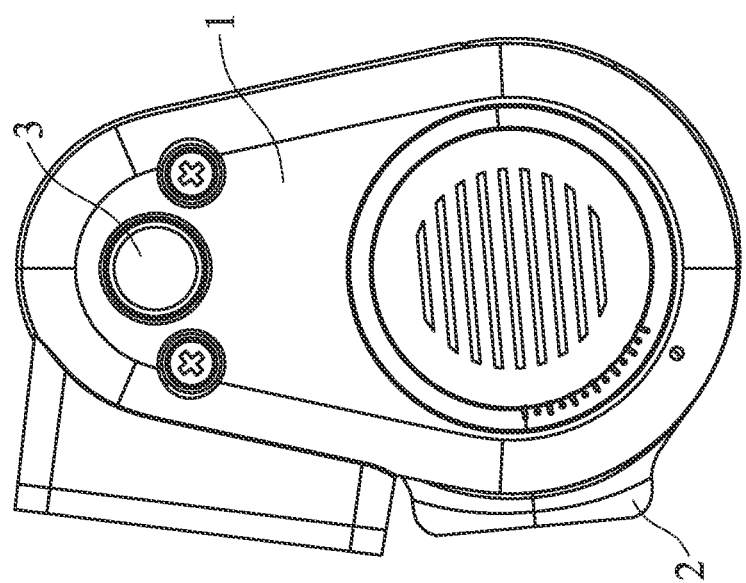
FIG. 1B is the side view of the image capturing device of the embodiment of the invention, wherein the lens module is in a second module orientation.

FIG. 1A is a side view of an image capturing device of the embodiment of the invention, wherein the lens module is in a first module orientation. FIG. 1B is the side view of the image capturing device of the embodiment of the invention, wherein the lens module is in a second module orientation. With reference to FIGS. 1A and 1B, the image capturing device C of the embodiment of the invention includes a device housing 1, a lens module 2, a restriction unit (not shown) and a latch 3. The lens module 2 pivots on the device housing 1, wherein relative to the device housing 1, the lens module 2 is adapted to be rotated between the first module orientation (FIG. 1A) and the second module orientation (FIG. 1B). The lens module 2 therefore can capture images with proper angle.

In one embodiment, the image capturing device C can be disposed in a vehicle or on a vehicle to capture images. The disclosure is not meant to restrict the invention.

Figure 2A:
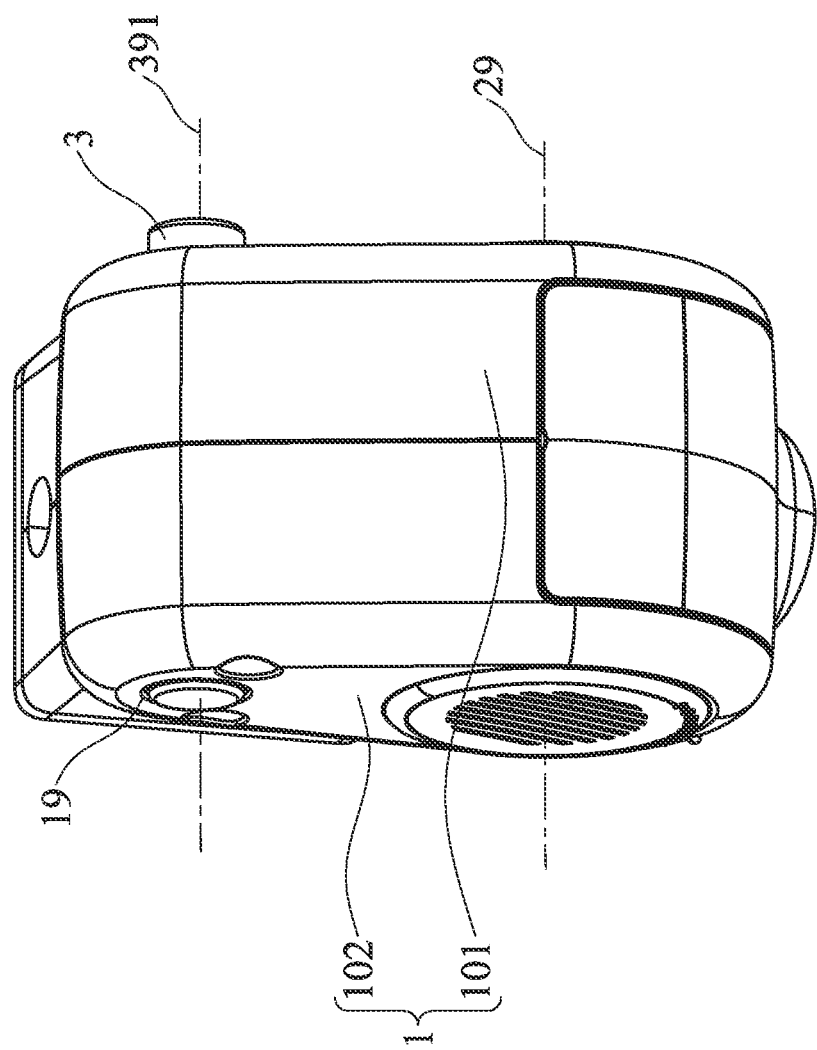
FIG. 2A is a perspective view of the image capturing device of the embodiment of the invention, wherein the latch is in a first latch position.
Figure 2B:
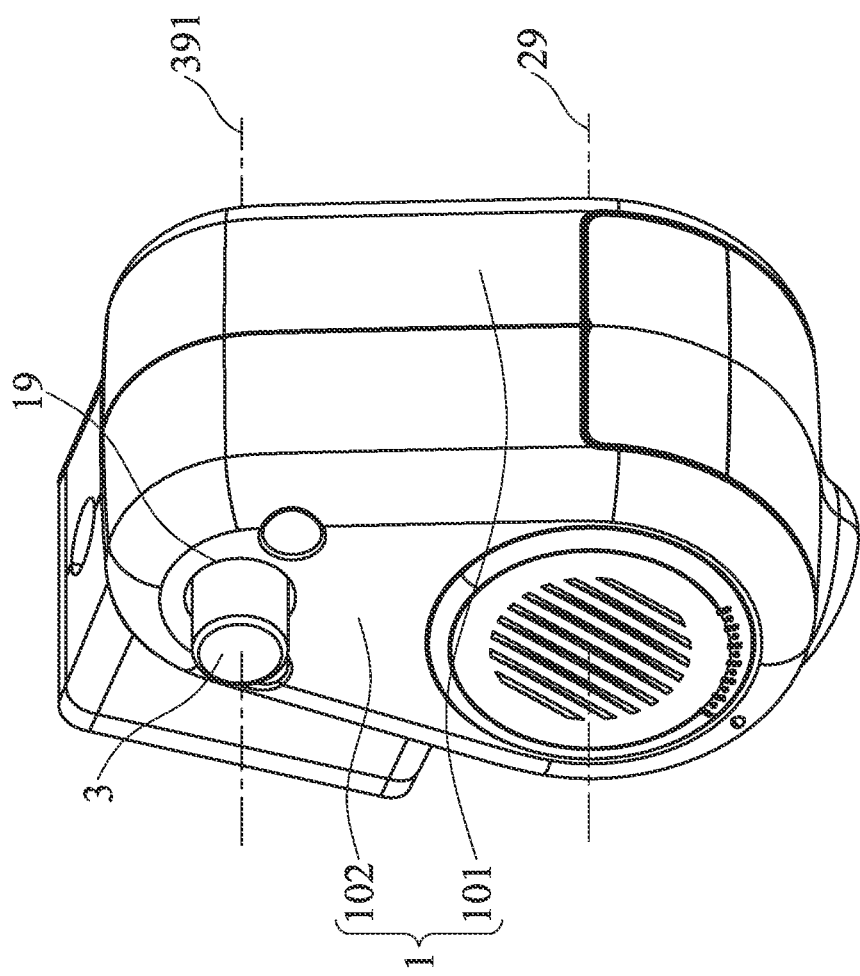
FIG. 2B is the perspective view of the image capturing device of the embodiment of the invention, wherein the latch is in a second latch position.
Figure 3A:
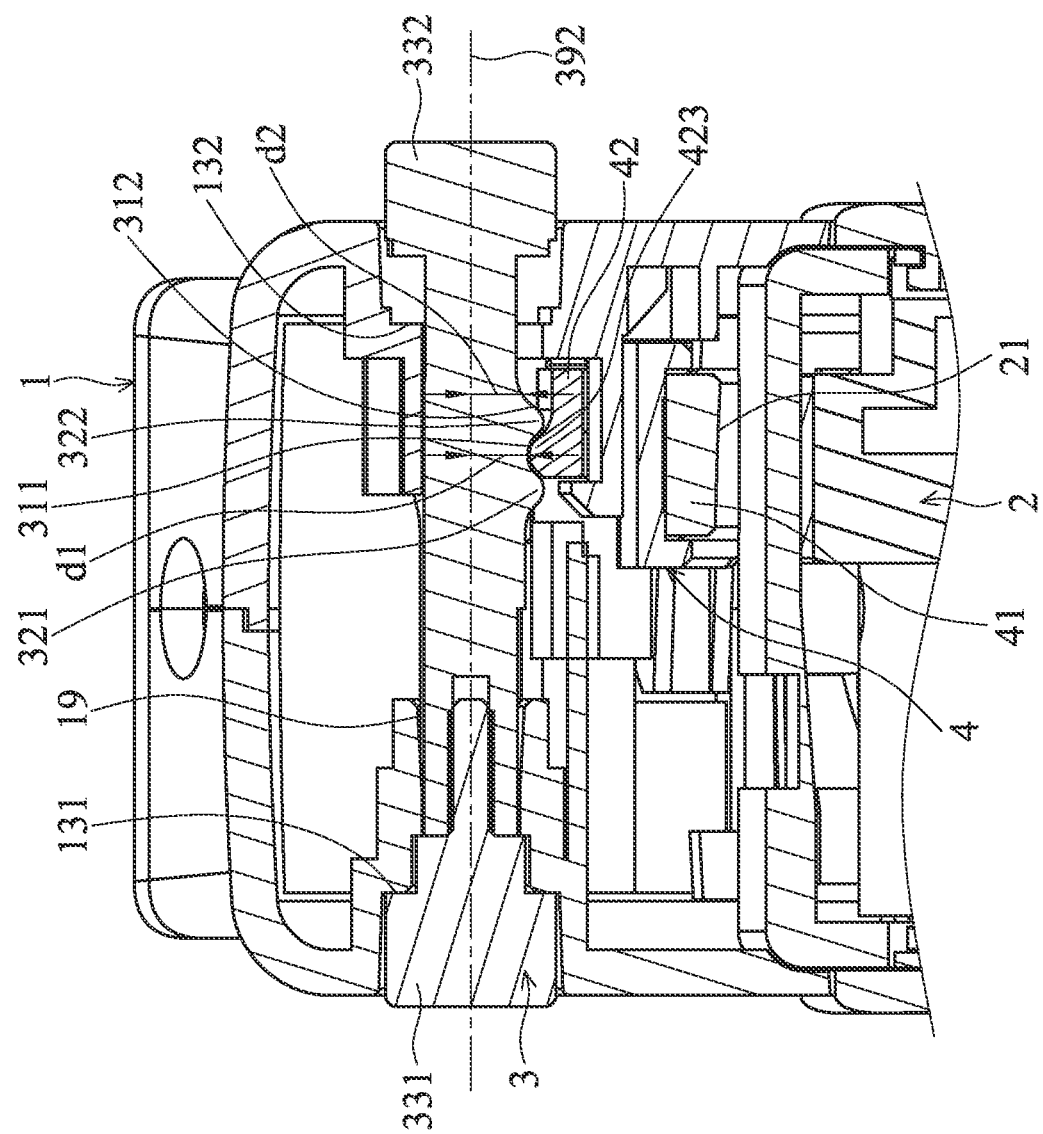
FIG. 3A is a cross sectional view of the image capturing device of the embodiment of the invention, wherein the latch is in the first latch position.
Figure 3B:
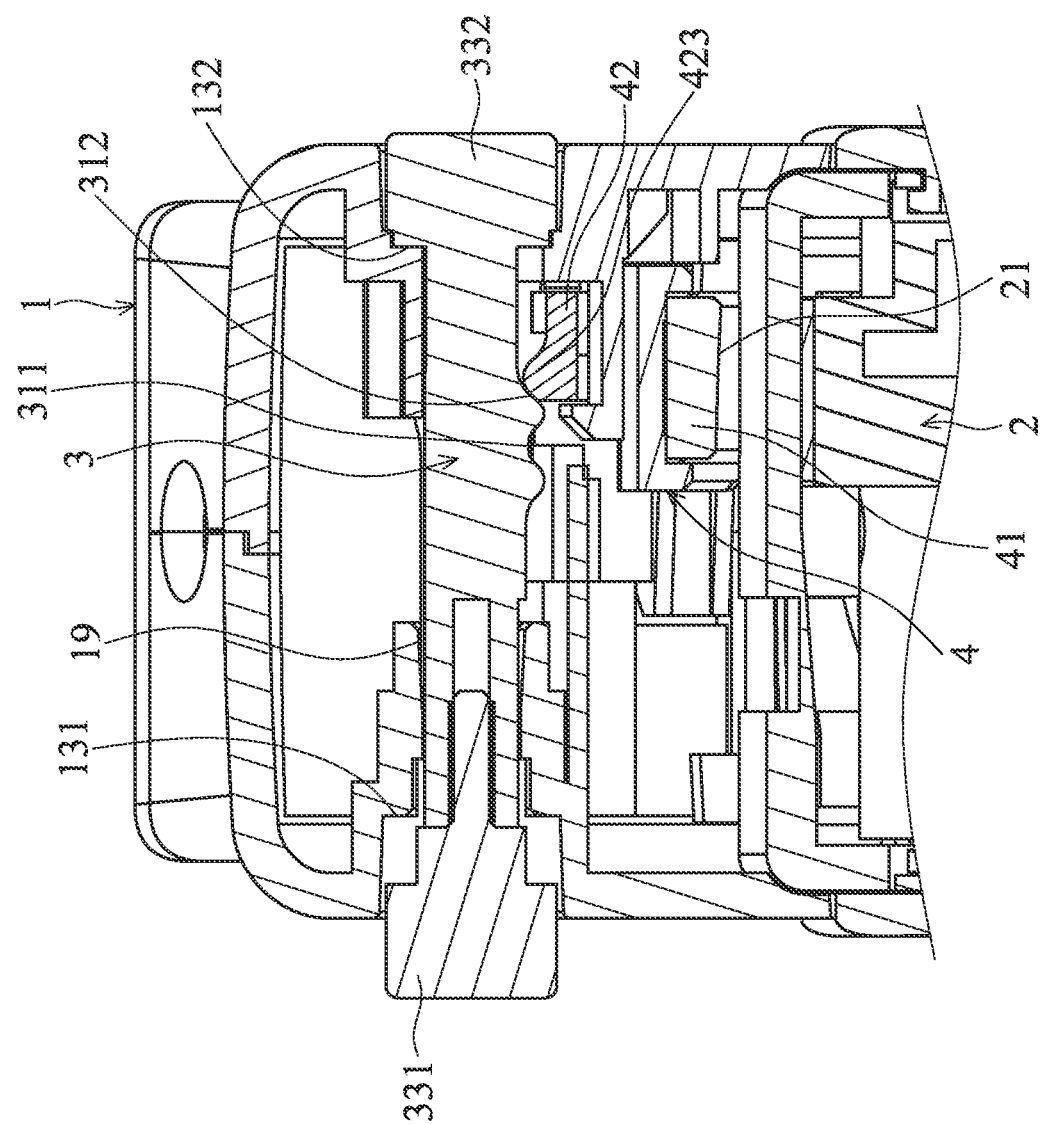
FIG. 3B is the cross sectional view of the image capturing device of the embodiment of the invention, wherein the latch is in the second latch position.

FIG. 2A is a perspective view of the image capturing device of the embodiment of the invention, wherein the latch is in a first latch position. FIG. 2B is the perspective view of the image capturing device of the embodiment of the invention, wherein the latch is in a second latch position. FIG. 3A is a cross sectional view of the image capturing device of the embodiment of the invention, wherein the latch is in the first latch position. FIG. 3B is the cross sectional view of the image capturing device of the embodiment of the invention, wherein the latch is in the second latch position. With reference to FIGS. 2A, 2B, 3A and 3B, the device housing 1 has an insertion slot 19. The restriction unit 4 is disposed in the device housing 1. The latch 3 passes through the insertion slot 19 of the device housing 1. The latch 3 is adapted to be moved between the first latch position (FIGS. 2A and 3A) and the second latch position (FIGS. 2B and 3B). When the latch 3 is in the first latch position (FIGS. 2A and 3A), the latch 3 sufficiently pushes the restriction unit 4, and the restriction unit 4 presses the lens module 2 to restrict the rotation of the lens module 2. When the latch 3 is in the second latch position (FIGS. 2B and 3B), the pressure from the latch 3 applied to the restriction unit 4 is decreased, and the lens module 2 is capable of being rotated relative to the device housing 1.

With reference to FIGS. 1A, 1B, 2A and 2B, in one embodiment, the lens module 2 is rotated between the first module orientation and the second module orientation around a rotational axis 29. The latch 3 is shifted between the first latch position and the second latch position along a sliding axis 391. The sliding axis 391 is parallel to the rotational axis 29.

With reference to FIGS. 2A, 2B, 3A and 3B, in one embodiment, the restriction unit 4 comprises a restriction gasket 41 and a restriction bracket 42. The restriction gasket 41 is disposed on the restriction bracket 42. The lens module 2 comprises a module surface 21. When the latch 3 is in the first latch position, the latch 3 sufficiently pushes the restriction bracket 42, and the restriction gasket 41 presses the module surface 21 to restrict the rotation of the lens module 2. By increasing the friction between the module surface 21 and the restriction gasket 41, the rotation of the lens module 2 is restricted. When the latch 3 is in the second latch position, the pressure from the latch 3 applied to the restriction bracket 42 is decreased, and the lens module 2 is capable of being rotated relative to the device housing 1. In one embodiment, when the latch 3 is in the second latch position (FIG. 3B), the restriction gasket 41 can still contact the module surface 21, and the compression of the restriction gasket 41 is less or none. There is only slight friction between the module surface 21 and the restriction gasket 41, and the orientation of the lens module 2 can be in a neutral equilibrium state.

With reference to FIGS. 3A and 3B, in one embodiment, the latch 3 comprises a first latch-pushing portion 311 and a second latch-pushing portion 312. When the latch 3 is in the first latch position (FIG. 3A), the first latch-pushing portion 311 abuts the restriction bracket 42. When the latch 3 is in the second latch position (FIG. 3B), the second latch-pushing portion 312 abuts the restriction bracket 42. A first distance d1 is formed between the first latch-pushing portion 311 and a latch axis 392, which is the axis of the latch 3. A second distance d2 is formed between the second latch-pushing portion 312 and the latch axis 392. The first distance d1 is greater than the second distance d2. When the latch 3 is in the second latch position, the latch 3 sufficiently presses the restriction bracket 42.

With reference to FIGS. 3A and 3B, in one embodiment, the latch 3 comprises a first latch protrusion 321 and a second patch latch protrusion 322. The first latch-pushing portion 311 is located between the first latch protrusion 321 and the second latch protrusion 322. The second latch protrusion 322 is located between the first latch-pushing portion 311 and the second latch-pushing portion 312. The first latch protrusion 321 and the second patch latch protrusion 322 are utilized to restrict the position of the latch 3 relative to the restriction bracket 42.

With reference to FIGS. 3A and 3B, in one embodiment, the latch 3 comprises a first latch end 331 and a second latch end 332. The device housing 1 comprises a first housing stopping portion 131 and a second housing stopping portion 132. When the latch 3 is in the first latch position (FIG. 3A), the first latch end 331 abuts the first housing stopping portion 131, and at least a portion of the second latch end 332 protrudes out of the device housing 1. When the latch 3 is in the second latch position (FIG. 3B), the second latch end 332 abuts the second housing stopping portion 132, and at least a portion of the first latch end 331 protrudes out of the device housing 1.

Figure 4:
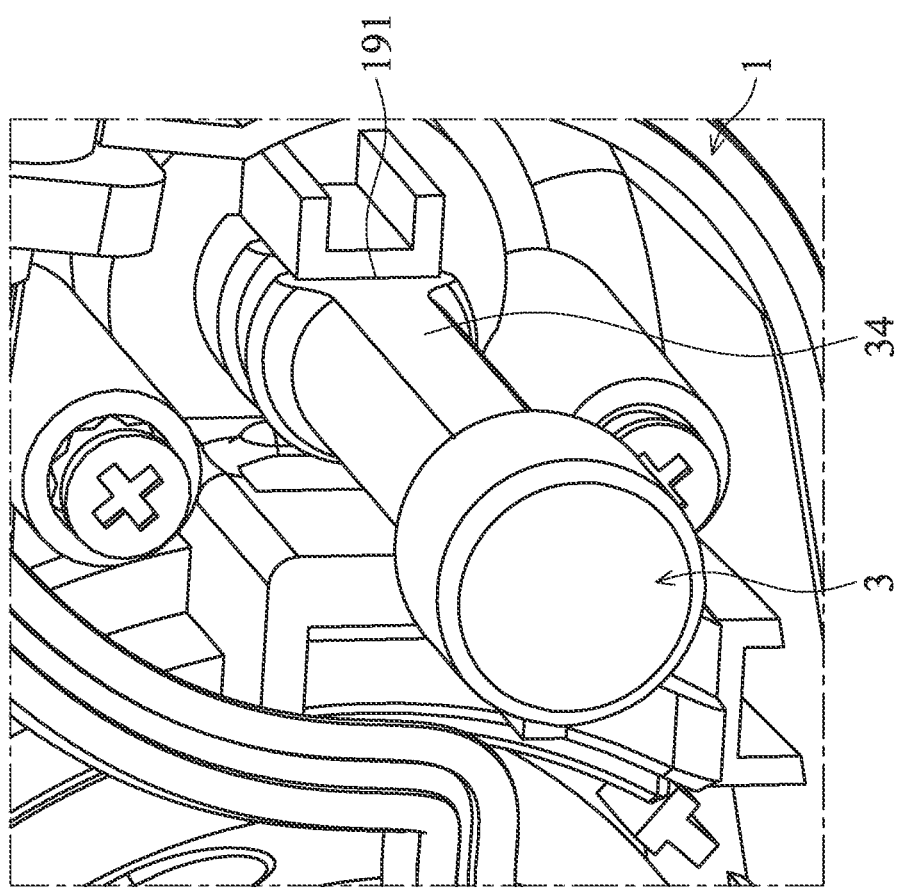
FIG. 4 shows the details of the latch of the embodiment of the invention.

With reference to FIG. 4, in one embodiment, the latch 3 is pillar shaped. The latch 3 comprises a latch planar surface 34. The device housing 1 comprises a housing planar surface 191. The housing planar surface 191 is formed in the insertion slot 19. The latch planar surface 34 abuts the housing planar surface 191. Therefore, the latch 3 is restricted from being rotated.

Figure 5:
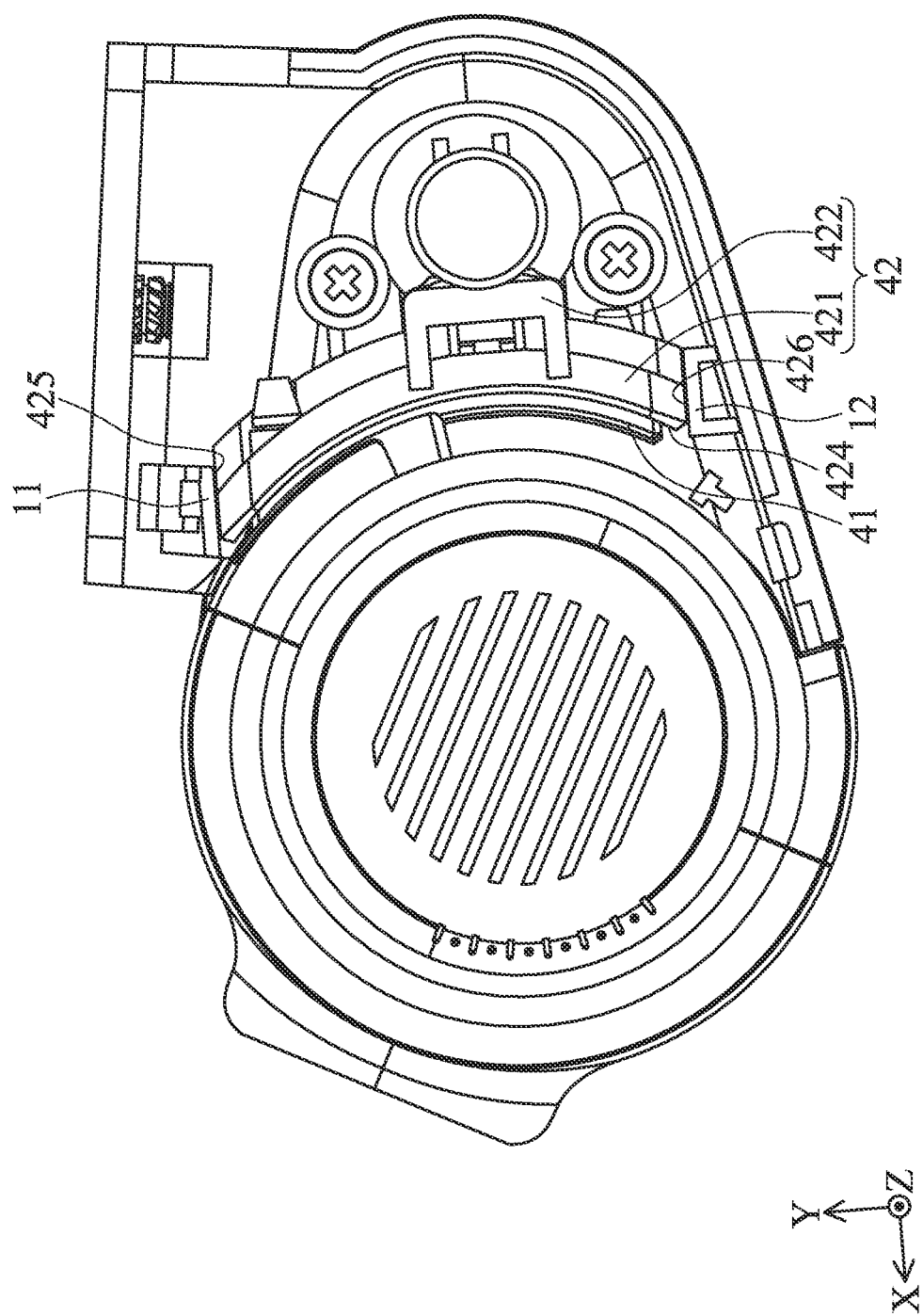
FIG. 5 is a side view of the restriction bracket in the device housing of the embodiment of the invention.
Figure 6:
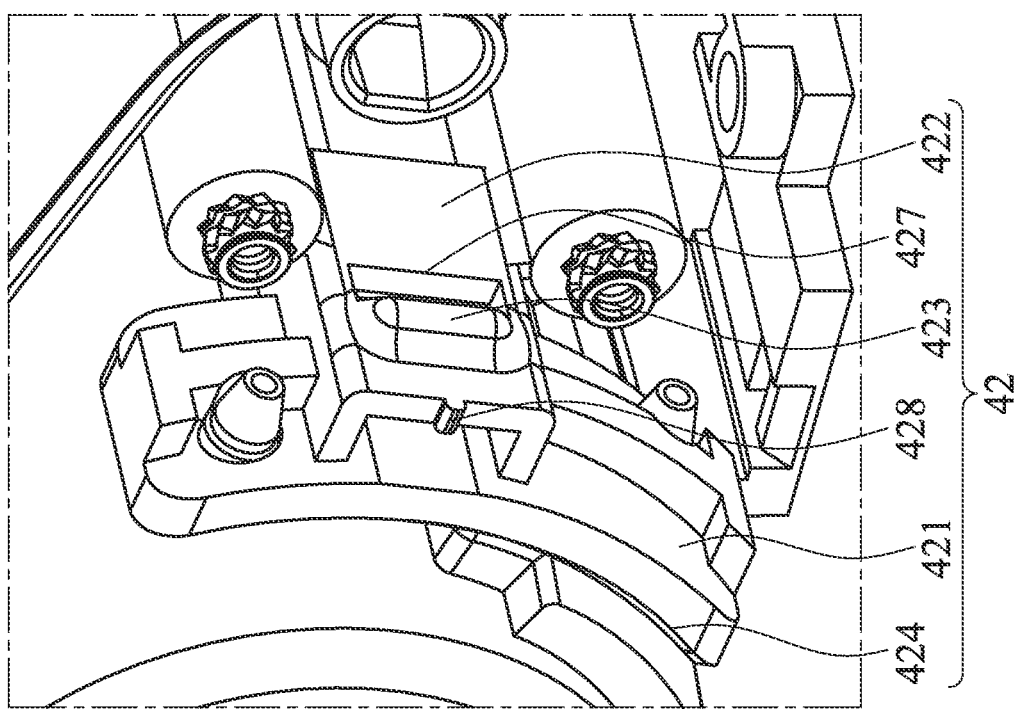
FIG. 6 shows the details of the restriction bracket of the embodiment of the invention.

FIG. 5 is a side view of the restriction bracket in the device housing of the embodiment of the invention. FIG. 6 shows the details of the restriction bracket of the embodiment of the invention. With reference to FIGS. 5 and 6, in one embodiment, the restriction bracket comprises a bracket body 421 and a bracket stage 422. The bracket stage 422 comprises a stage rib 423. The bracket body 421 comprises a curved bracket surface 424. The bracket stage 422 is connected to the bracket body 421. The restriction gasket 41 is disposed on the curved bracket surface 424. With reference to FIGS. 3A and 3B, when the latch 3 is in the first latch position, the latch 3 sufficiently pushes the stage rib 423. When the latch 3 is in the second latch position, the pressure from the latch 3 applied to the stage rib 423 is decreased.

With reference to FIG. 5, in one embodiment, the device housing 1 comprises a first housing wall 11 and a second housing wall 12. The first housing wall 11 faces the second housing wall 12. The bracket body 421 comprises a first body side 425 and a second body side 426. The first housing wall 11 is adapted to abut the first body side 425. The second housing wall 12 is adapted to abut the second body side 426. The first housing wall 11 and the second housing wall 12 restrict the movement of the restriction bracket 42 in a first direction Y. The restriction bracket 42 is adapted to slide in a second direction X between the first housing wall 11 and the second housing wall 12. The second direction X is perpendicular to the first direction Y.

Figure 7:
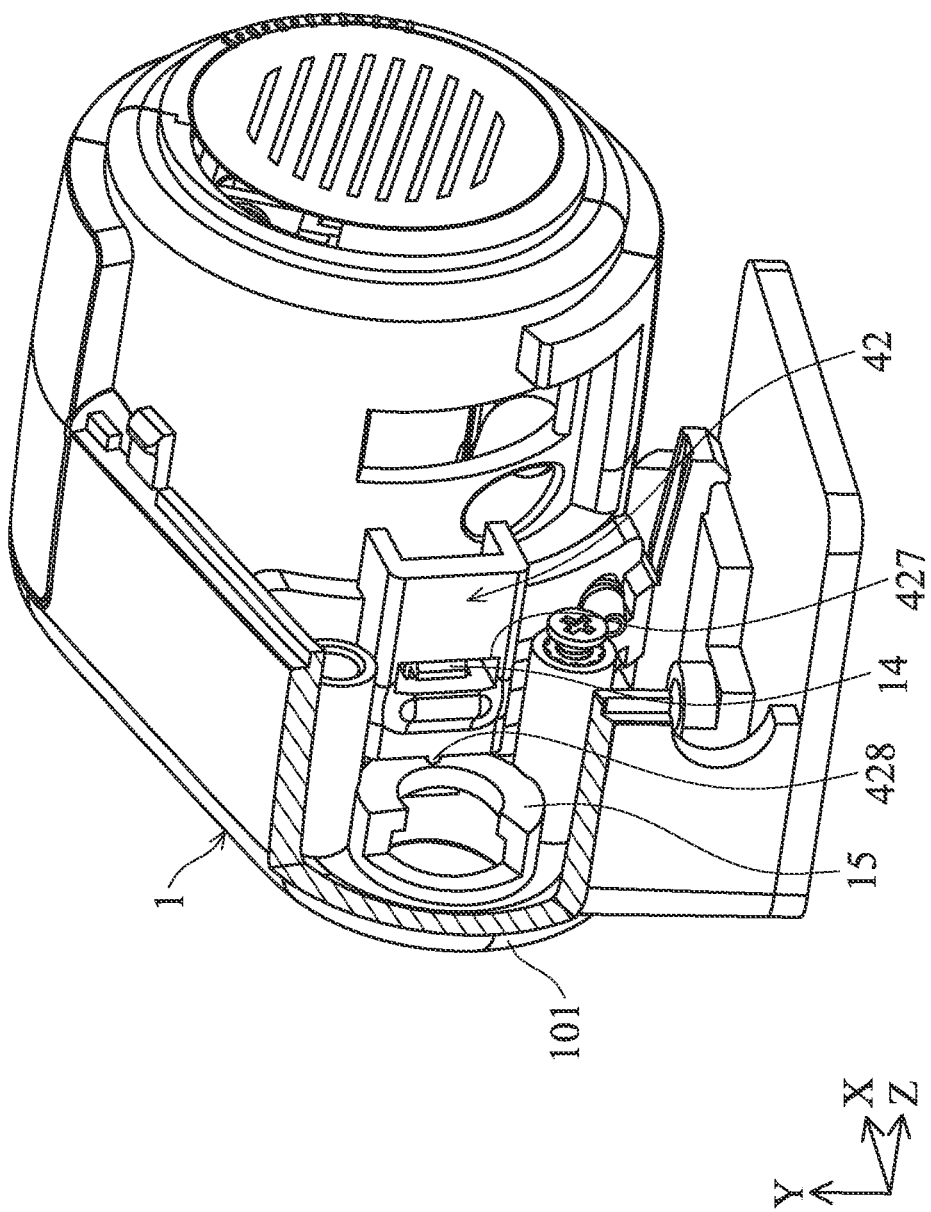
FIG. 7 shows the restriction bracket conned to the device housing of the embodiment of the invention.

FIG. 7 shows the restriction bracket conned to the device housing of the embodiment of the invention. With reference to FIGS. 6 and 7, in one embodiment, the device housing 1 comprises a housing hook 14. The restriction bracket 42 comprises a bracket opening 427. The housing hook 14 extends into the bracket opening 427. The housing hook 14 is adapted to abut an inner wall of the bracket opening 427 to restrict the movement of the restriction bracket 42 in a third direction Z. The third direction Z is perpendicular to the first direction Y and the second direction X. The restriction bracket 42 comprises a bracket rib 428, and the device housing 1 comprises a third housing wall 15. The bracket rib 428 is adapted to abut the third housing wall 15 to restrict the movement of the restriction bracket 42 in the third direction Z.

With reference to FIGS. 2A, 2B and 7, in one embodiment, the device housing 1 is combined by a first housing member 101 and a second housing member 102. The housing hook 14 and the third housing wall 15 are formed on the first housing member 101.

In the image capturing device of the embodiment of the invention, the orientation of the lens module can be locked by the latch. In the locked state, the position of the latch is restricted, and the latch is prevented from being loosened by outer vibration. The restriction unit can continuously restrict the orientation of the lens module, and the reliability of the image capturing device is improved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capturing device, comprising:
a device housing, having an insertion slot;
a lens module, pivoting on the device housing, wherein relative to the device housing, the lens module is adapted to be rotated between a first module orientation and a second module orientation;
a restriction unit, disposed in the device housing; and
a latch, passing through the insertion slot of the device housing, wherein the latch is adapted to be moved between a first latch position and a second latch position, and when the latch is in the first latch position, the latch sufficiently pushes the restriction unit, and the restriction unit presses the lens module to restrict the rotation of the lens module, and when the latch is in the second latch position, the pressure from the latch applied to the restriction unit is decreased, and the lens module is capable of being rotated relative to the device housing.

2. The image capturing device as claimed in claim 1, wherein the lens module is rotated between the first module orientation and the second module orientation around a rotational axis, the latch is shifted between the first latch position and the second latch position along a sliding axis, and the sliding axis is parallel to the rotational axis.

3. The image capturing device as claimed in claim 2, wherein the restriction unit comprises a restriction gasket and a restriction bracket, the restriction gasket is disposed on the restriction bracket, the lens module comprises a module surface, and when the latch is in the first latch position, the latch sufficiently pushes the restriction bracket, the restriction gasket presses the module surface to restrict the rotation of the lens module, and when the latch is in the second latch position, the pressure from the latch applied to the restriction bracket is decreased, and the lens module is capable of being rotated relative to the device housing.

4. The image capturing device as claimed in claim 3, wherein the latch comprises a first latch-pushing portion and a second latch-pushing portion, and when the latch is in the first latch position, the first latch-pushing portion abuts the restriction bracket, and when the latch is in the second latch position, the second latch-pushing portion abuts the restriction bracket, a first distance is formed between the first latch-pushing portion and a latch axis of the latch, a second distance is formed between the second latch-pushing portion and the latch axis, and the first distance is greater than the second distance.

5. The image capturing device as claimed in claim 4, wherein the latch is pillar shaped, the latch comprises a latch planar surface, the device housing comprises a housing planar surface, the housing planar surface is formed in the insertion slot, and the latch planar surface abuts the housing planar surface.

6. The image capturing device as claimed in claim 4, wherein the restriction bracket comprises a bracket body and a bracket stage, the bracket stage comprises a stage rib, the bracket body comprises a curved bracket surface, the bracket stage is connected to the bracket body, the restriction gasket is disposed on the curved bracket surface, and when the latch is in the first latch position, the latch sufficiently pushes the stage rib, and when the latch is in the second latch position, the pressure from the latch applied to the stage rib is decreased.

7. The image capturing device as claimed in claim 4, wherein the latch comprises a first latch protrusion and a second patch protrusion, the first latch-pushing portion is located between the first latch protrusion and the second latch protrusion, and the second latch protrusion is located between the first latch-pushing portion and the second latch-pushing portion.

8. The image capturing device as claimed in claim 7, wherein the device housing comprises a first housing wall and a second housing wall, the first housing wall faces the second housing wall, the bracket body comprises a first body side and a second body side, the first housing wall is adapted to abut the first body side, the second housing wall is adapted to abut the second body side, the first housing wall and the second housing wall restrict the movement of the restriction bracket in a first direction, the restriction bracket is adapted to slide in a second direction between the first housing wall and the second housing wall, and the second direction is perpendicular to the first direction.

9. The image capturing device as claimed in claim 8, wherein the device housing comprises a housing hook, the restriction bracket comprises a bracket opening, the housing hook extends into the bracket opening, the housing hook is adapted to abut an inner wall of the bracket opening to restrict the movement of the restriction bracket in a third direction, the third direction is perpendicular to the first direction and the second direction, the restriction bracket comprises a bracket rib, the device housing comprises a third housing wall, and the bracket rib is adapted to abut the third housing wall to restrict the movement of the restriction bracket in the third direction.

10. The image capturing device as claimed in claim 7, wherein the latch comprises a first latch end and a second latch end, the device housing comprises a first housing stopping portion and a second housing stopping portion, and when the latch is in the first latch position, the first latch end abuts the first housing stopping portion, and at least a portion of the second latch end protrudes out of the device housing, and when the latch is in the second latch position, the second latch end abuts the second housing stopping portion, and at least a portion of the first latch end protrudes out of the device housing.

* * * * *